United States Patent [19]
Morgan et al.

[11] Patent Number: 5,474,806
[45] Date of Patent: Dec. 12, 1995

[54] COATING SURFACE OF HYDROPHOBIC MICROPOROUS THERMAL INSULATION MATERIAL

[75] Inventors: Derek E. Morgan, Malvern; James D. J. Jackson; Tony M. Matthews, both of Kidderminster, all of United Kingdom

[73] Assignee: Zortech International Limited, United Kingdom

[21] Appl. No.: 247,338

[22] Filed: May 23, 1994

Related U.S. Application Data

[63] Continuation-in-part of Ser. No. 13,335, Feb. 4, 1993, abandoned.

[30] Foreign Application Priority Data

Feb. 7, 1992 [GB] United Kingdom ............... 9202584

[51] Int. Cl.⁶ ....................................... B08D 3/08
[52] U.S. Cl. ................ 427/223; 427/226; 427/242; 427/314; 427/385.5; 427/397.7
[58] Field of Search ........................ 427/223, 314, 427/385.5, 397.7, 243, 226

[56] References Cited

U.S. PATENT DOCUMENTS

| | | | |
|---|---|---|---|
| 3,223,578 | 12/1965 | Lineburg | 161/254 |
| 3,947,397 | 3/1976 | Schuster | 260/29.6 |
| 4,212,925 | 7/1980 | Kratel et al. | 428/447 |
| 4,529,630 | 7/1985 | Schmidt et al. | 427/397.7 |
| 4,626,466 | 12/1986 | Schmidt et al. | 428/247 |
| 4,670,101 | 6/1987 | Schmidt et al. | 162/152 |
| 5,114,510 | 5/1992 | Wright | 156/82 |

FOREIGN PATENT DOCUMENTS

| | | |
|---|---|---|
| 0002502 | 12/1979 | European Pat. Off. . |
| 0090883 | 7/1982 | European Pat. Off. . |
| 0130629 | 8/1982 | European Pat. Off. . |
| 3713526 | 2/1988 | Germany . |
| 418213 | 7/1966 | Switzerland . |
| 1042897 | 9/1966 | United Kingdom . |
| 1159021 | 7/1969 | United Kingdom . |
| 1350661 | 4/1974 | United Kingdom . |
| 1411592 | 10/1975 | United Kingdom . |
| 1411596 | 10/1975 | United Kingdom . |
| 1424425 | 2/1976 | United Kingdom . |

*Primary Examiner*—Janyce Bell
*Attorney, Agent, or Firm*—Ira D. Dorman

[57] ABSTRACT

A surface of a hydrophobic microporous thermal insulation material is coated by first heating the surface of the microporous thermal insulation material so as to provide a hydrophilic surface layer on the hydrophobic material. Subsequently, a water-based coating, such as a water-based silicate adhesive, is applied to the hydrophilic surface layer of the hydrophobic material. An abrasive-and/or impact-resistant cover, such as a glass fibre cloth, may be applied to the coating.

10 Claims, 3 Drawing Sheets

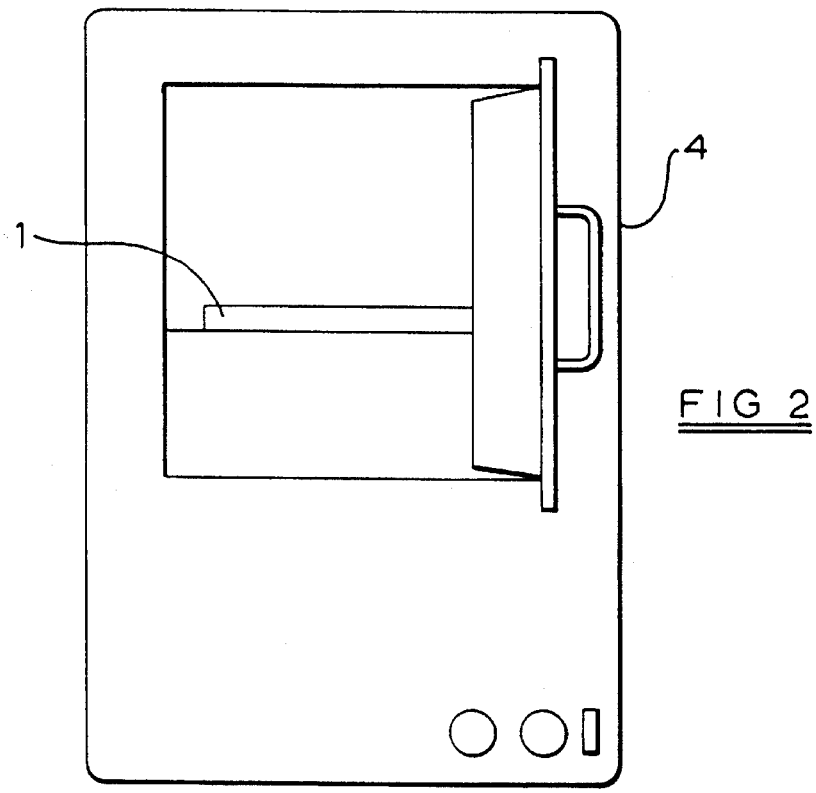
FIG 2
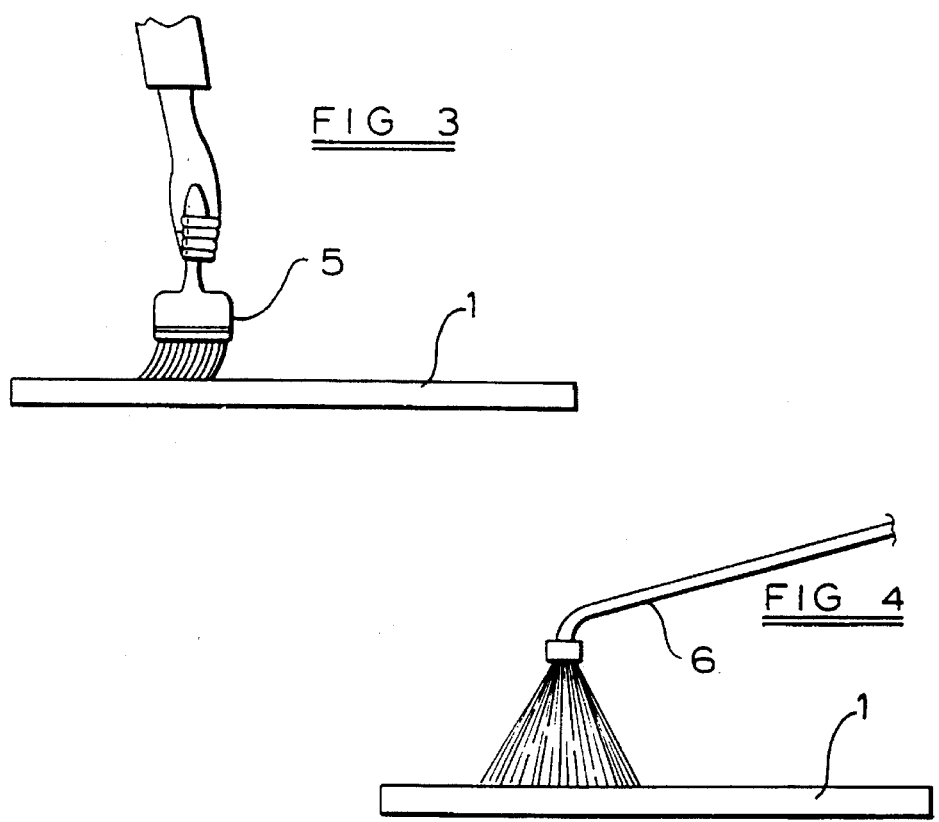
FIG 3
FIG 4

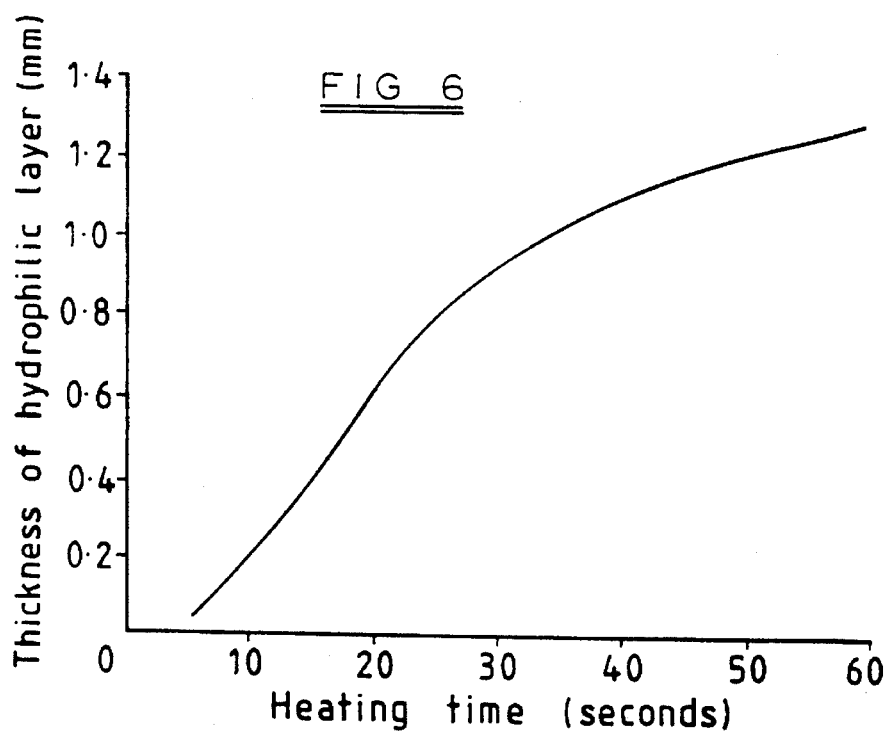
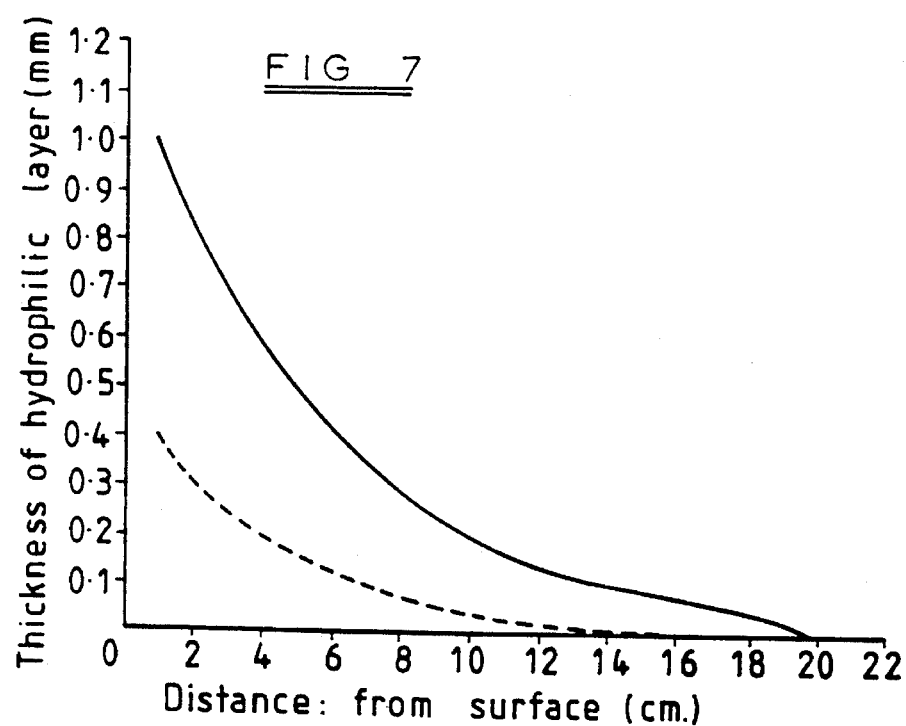

COATING SURFACE OF HYDROPHOBIC MICROPOROUS THERMAL INSULATION MATERIAL

The present invention relates to a method of coating a surface of hydrophobic microporous thermal insulation material. This application is a continuation-in-part of U.S. patent application Ser. No. 08/013,335, filed Feb. 4, 1993, now abandoned.

BACKGROUND OF THE INVENTION

The term 'microporous' is used herein to identify porous or cellular materials in which the ultimate size of the cells or voids is less than the mean free path of an air molecule at NTP, i.e. of the order of 100 nm or smaller. A material which is microporous in this sense will exhibit very low transfer of heat by air conduction (that is collisions between air molecules). Such microporous materials include aerogel, which is a gel in which the liquid phase has been replaced by a gaseous phase in such a way as to avoid the shrinkage which would occur if the gel were dried directly from a liquid. A substantially identical structure can be obtained by controlled precipitation from solution, the temperature and pH being controlled during precipitation to obtain an open lattice precipitate. Other equivalent open lattice structures include pyrogenic (fumed) and electro-thermal types in which a substantial proportion of the particles have an ultimate particle size less than 100 nm. Any of these materials, based for example on silica, alumina or other metal oxides, may be used to prepare a composition which is microporous as defined above.

DESCRIPTION OF PRIOR ART

A known form of high performance microporous thermal insulation material comprises compacted microporous silica particles, and typically includes ceramic fibre reinforcement and rutile powder opacifier. Such a microporous thermal insulation material is described, for example, in United Kingdom Patent Specification No. 1,350,661.

Microporous thermal insulation material is generally hydrophilic in that it is readily wetted by water and absorbs the same. Unfortunately, the water on drying breaks down the microporous nature of the material and renders it unsuitable for use as a high-performance thermal insulation material. It is well known to the skilled person, however, that the microporous thermal insulation material can be rendered generally hydrophobic for example by incorporating water-repellant materials (hydrophobing agents) into the inorganic microporous material. For example, U.S. Pat. No. 4,212,925, describes a process for treating microporous thermal insulating material with a hydrophobing agent in the form of at least one organosilicon compound containing from 1 to 4 silicon atoms. Compacted hydrophobic microporous thermal insulation materials are weaker than conventional microporous thermal insulation materials because the hydrophobic treatment reduces the bonding effect between the silica particles. Hydrophobic microporous thermal insulation materials therefore generally require some form of protective coating to prevent damage to the microporous material during handling.

A disadvantage of such hydrophobic microporous thermal insulation material is that it is difficult and time consuming to coat the surface of the hydrophobic material directly, for example with water-based silicate adhesive. This is because water-based coating compositions remain in discrete droplets on the surface of the hydrophobic material and do not readily form a continuous protective coating. Surface active agents can be used to modify the surface of compacted hydrophobic microporous thermal insulation material sufficiently to allow the material to be coated with a water-based coating, but it is difficult to control the extent of penetration of the surface active agent below the surface of the microporous material and the presence of such surface active agents in the body of the microporous material further weakens the bond between the silica particles. These microporous thermal insulation materials are generally vulnerable to damage by abrasion and impact and an adhesive coating can be used for example to apply an abrasion- and impact-resistant cover, such as glass fibre cloth, to the surface of the microporous thermal insulation material.

It is known from U.S. Pat. No. 3,947,397, to apply water-based coatings to asbestos-cement. However, asbestos-cement materials are generally hydrophilic in that they are readily wetted by water and are absorbent of water. Further, although U.S. Pat. No. 3,947,397, teaches the use of a flaming process to raise the temperature of the asbestos-cement material and to speed up curing of the coating composition, there is no disclosure of any modification of the surface properties of the asbestos-cement. Indeed, the patent clearly teaches that the asbestos-cement is substantially unaffected by the heat treatment.

OBJECT OF THE INVENTION

It is therefore an object of the present invention to provide a relatively simple and economic method of applying a water-based protective coating to the surface of a microporous thermal insulation material which incorporates a hydrophobing agent without destroying the hydrophobic properties of the remainder of the microporous material.

SUMMARY OF THE INVENTION

According to the present invention there is provided a method of coating a surface of hydrophobic microporous thermal insulation material comprising the steps of:

providing an inorganic microporous thermal insulation material having a surface, the thermal insulation material incorporating a hydrophobing agent so as to render the insulation material hydrophobic;

heating said surface of said hydrophobic microporous thermal insulation material so as to produce a surface layer of hydrophilic microporous thermal insulation material on said hydrophobic material; and applying a protective water-based coating composition to said hydrophilic surface layer of said hydrophobic material.

The hydrophobic microporous thermal insulation material may comprise a block of material formed by compacting a dry particulate mixture of finely divided metal oxide, such as pyrogenic silica or alumina or silica or alumina aerogel which has subsequently been treated with a silane material to render it hydrophobic, with up to 5 per cent by weight of finely divided metal oxide which has not been treated to render it hydrophobic, up to 50 per cent by weight of an infra-red opacifier and up to 20 per cent by weight of a reinforcing fibre. We have found that the small proportion of untreated finely divided material, such as pyrogenic alumina or alumina aerogel, has no detrimental effect on the overall hydrophobic nature of the hydrophobic microporous thermal insulation material. The infra-red opacifier may be a finely divided radiation scattering material having a high refractive index such as titania for example in its rutile form, alumina, zirconia, iron oxide or chrome oxide. The reinforcing fibre may be, for example, ceramic fibre such as alumina fibre or alumino-silicate fibre, glass fibre or other inorganic fibre.

Thus the microporous thermal insulation material may be a substantially inorganic, non-fusible, compacted particulate material which incorporates a hydrophobing agent which may be applied to the microporous ingredients during their manufacture or to the compacted constituents of the insulation material. The hydrophobic microporous thermal insulation material may comprise:

- 49–97 per cent by weight hydrophobic microporous metal oxide
- 0–5 per cent by weight untreated microporous metal oxide
- 1–20 per cent by weight reinforcing fibre
- 2–50 per cent by weight opacifier In one preferred embodiment the hydrophobic microporous thermal insulation material may comprise:

- 58 per cent by weight hydrophobic pyrogenic silica
- 10 per cent by weight reinforcing fibre
- 32 per cent by weight opacifier The hydrophobic pyrogenic silica may be of the type Aerosil R974 commercially available from Degussa AG, Germany, and to which the hydrophobing agent is applied during manufacture of the microporous material. The reinforcing fibre may be in the form of alumino-silicate fibres sold under the Trade Mark FIBERFRAX and the opacifier may be titania in its rutile form.

In another preferred embodiment the hydrophobic microporous thermal insulation material may comprise:

- 60.0 per cent by weight hydrophobic pyrogenic silica
- 1.9 per cent by weight untreated alumina
- 4.8 per cent by weight reinforcing fibre
- 33.3 per cent by weight opacifier The hydrophobic pyrogenic silica may be of the type Aerosil R974 commercially available from Degussa AG, Germany. The alumina may be of the type Aluminium Oxide C also commercially available from Degussa AG. The reinforcing fibre may be in the form of alumina fibres sold under the Trade Mark SAFFIL and the opacifier may be titania in its rutile form.

The surface of the microporous thermal insulation material may be heated with a gas burner to drive off, evaporate or decompose the hydrophobing agent. The gas burner may be provided with an elongate flame nozzle. The gas burner may be fuelled with a mixture of an inflammable gas and compressed air.

Alternatively, the surface of the microporous thermal insulation material may be heated in a furnace.

The coating composition may be applied by brushing or spraying.

The coating composition may be selected from the group consisting of a water-based silicate adhesive, a clay filled water-based silicate adhesive, a water-based paint, a water-based boron carbide composition, a water-based silica sol containing ceramic fibre and a clay filler, water-based colloidal silica, water-based polyvinylalcohol adhesive, and a solution of methyl cellulose in water.

The method may include the step of applying an abrasive- and/or impact-resistant cover, such as glass fibre cloth, to the coating composition.

For a better understanding of the present invention and to show more clearly how it may be carried into effect reference will now be made, by way of example, to the accompanying drawings in which:

BRIEF DESCRIPTION OF THE DRAWINGS

FIG. 2 shows a method of heating the surface of a block of hydrophobic microporous thermal insulation material in a furnace so as to render the surface hydrophilic;

FIG. 3 shows a method of applying a coating by brushing onto the hydrophilic surface created by heating the surface of a block of hydrophobic microporous thermal insulation;

FIG. 4 shows a method of applying a coating by spraying onto the hydrophilic surface created by heating the surface of a block of hydrophobic microporous thermal insulation;

FIG. 6 is a graph illustrating the effect of different heating times on the surface of a block of hydrophobic microporous thermal insulation material; and FIG. 7 is a graph illustrating the effect of a heat source held at different distances from the surface of a block of hydrophobic microporous thermal insulation material.

DESCRIPTION OF PREFERRED EMBODIMENTS

Figure 1:
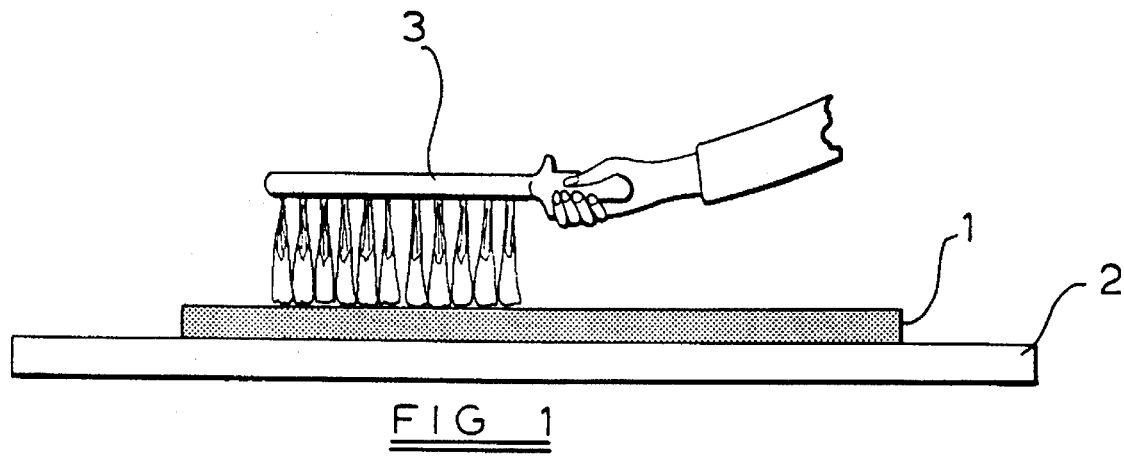
FIG. 1 shows one method of flame-treating the surface of a block of hydrophobic microporous thermal insulation material so as to render the surface hydrophilic.

As shown in FIG. 1, a block 1 of inorganic microporous thermal insulation material incorporating a hydrophobing agent is placed on a suitable surface 2 and a face of the block is heat-treated with a hand-held burner 3. The burner 3 is fuelled with a suitable inflammable gas, such as propane gas, and compressed air and emits a plurality of relatively narrow flames from an elongate flame nozzle to produce a total flame width of about 100 mm.

Figure 5:
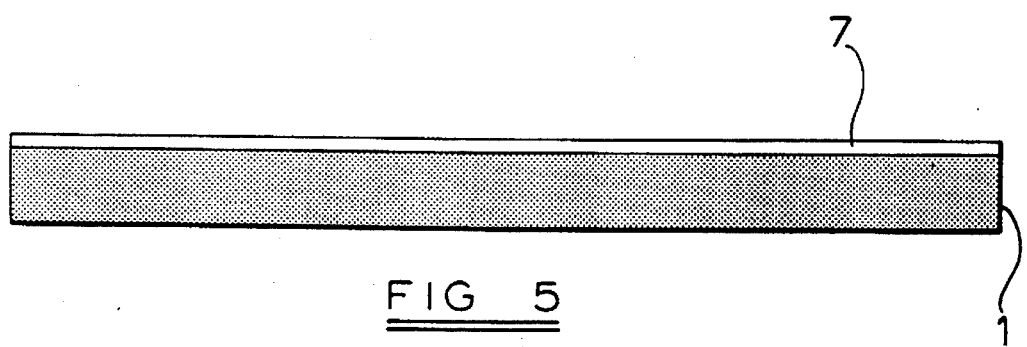
FIG. 5 shows a cover applied to the coating on the hydrophilic surface.

We have found that even the briefest exposure of the surface of the hydrophobic microporous thermal insulation material to the flame will drive off, evaporate or decompose the hydrophobing agent and render the surface hydrophilic such that it will readily accept a water-based coating composition. The water-based coating composition may either be a solution or a suspension. Examples of suitable water-based coating compositions are: a water-based silicate adhesive, with or without a clay filler, water-based paints, water-based boron carbide compositions, water-based silica sol containing ceramic fibre and a clay filler, water-based colloidal silica, water-based polyvinylalcohol (PVA) adhesive, and a solution of methyl cellulose in water. An example of a clay filled water-based silicate adhesive is that sold by Chamtek Idenden Alumet under the Trade Mark HT Fibre Adhesive 10.02, an example of a water-based paint is DULUX matt emulsion sold by ICI Limited, an example of a fire-retardant water-based paint is that sold under the Trade Mark TIMONOX by Becker Industrial Coatings Limited, an example of a water-based boron carbide coating composition is that sold under the Trade Mark COMBAT by The Standard Oil Company, an example of a water-based silica sol with ceramic fibre and a clay filler is that sold under the Trade Mark ZORKOTE by Zortech International Limited. The remaining materials are well known to the skilled person and are widely available commercially. A suitable coating composition, such as an adhesive, enables a protective cover of glass fibre cloth 7 to be applied to the surface of the microporous thermal insulation material as illustrated in FIG. 5. The coating composition can be applied, for example, by brushing with a brush 5 as illustrated in FIG. 3 or by spraying with a spray nozzle 6 as illustrated in FIG. 4.

Applying the coating composition and the protective cover to the flame-treated microporous thermal insulation material was found to be considerably easier and quicker than applying a coating composition and a protective cover directly to the hydrophobic insulation material.

In addition to heat-treating substantially flat surfaces, we have also successfully treated the surfaces of arcuate moulded components of hydrophobic microporous thermal insulation so as to enable a coating composition to be applied readily to the treated surface.

Instead of using a hand held burner, it is possible to use a burner mounted on a support. The burner may, for example, be adjustable as to the distance thereof from the hydrophobic microporous thermal insulation material to be treated. As a further alternative, the block 1 of hydrophobic thermal insulation material can be placed in a furnace 4, for example at 1000° C., for a suitable time such as 30 to 60 seconds.

We have carried out tests to determine the effect of flame heat-treatment on the surface of a block of hydrophobic microporous thermal insulation material.

In a first test the elongate nozzle of the burner 3 was held 4 cm above the surface of the hydrophobic microporous thermal insulation material and the thickness of the hydrophilic layer produced was determined for different heating times. The results of the first test are summarised in FIG. 6 which shows that the thickness of the hydrophilic layer increases with increasing heating times as might be expected. However, FIG. 6 also shows that a measurable thickness for the hydrophilic layer arises with relatively short heating times, while the increase in thickness of the hydrophilic layer falls off with increasing heating times. Thus the thickness of the hydrophilic layer is relatively insensitive to the heating time in the flame and a hydrophilic surface layer can be created without destroying the hydrophobic nature of the underlying material.

In a second test, a heat source in the form of the elongate flame nozzle of the burner 3 was held at different distances above the surface of the hydrophobic microporous thermal insulation material and the thickness of the hydrophilic layer produced was determined for heating times in the flame of 10 seconds and 20 seconds. The results of the second test are summarised in FIG. 7 in which the results for a heating time of 20 seconds are shown as a solid line and the results for a heating time of 10 seconds are shown as a dashed line. FIG. 7 shows that the thickness of the hydrophilic layer decreases with increasing distance from the flame nozzle as might be expected. However, FIG. 7 also shows that the thickness of the hydrophilic layer is relatively constant over a wide range of distance. Thus the thickness of the hydrophilic layer is relatively insensitive to the distance of the flame nozzle from the surface of the hydrophobic microporous thermal insulation material.

These tests show that heat treatment of hydrophobic microporous thermal insulation material is practicable for use in an industrial environment where both the heating time and the distance of a hand held flame nozzle, for example, are likely to vary. Within wide limits the heat treatment will provide a hydrophilic surface layer that will readily accept a water-based coating composition without destroying the hydrophobic nature of the underlying microporous material.

The invention is illustrated by the following examples:

EXAMPLE 1 (COMPARATIVE)

A block of conventional hydrophilic microporous thermal insulation material was treated with water and with a number of water-based coating compositions. When treated with water, the water was readily absorbed but caused the thermal insulation material to shrink and destroyed the microporous nature of those parts of the microporous thermal insulation material that came into contact with the water, thereby rendering the microporous thermal insulation material unusable.

When treated with a water-based fire retardant paint sold under the Trade Mark TIMONOX, the paint readily wetted the surface of the microporous thermal insulation material and formed a continuous protective coating thereon. However, the water in the paint caused the thermal insulation material to shrink and destroyed the microporous nature of those parts of the microporous thermal insulation material that came into contact with the water, thereby rendering the microporous thermal insulation material unusable.

When treated with a water-based coating composition sold under the Trade Mark ZORKOTE, the coating composition readily wetted the surface of the microporous thermal insulation material and formed a continuous protective coating thereon. However, the water in the coating composition again caused the thermal insulation material to shrink and destroyed the microporous nature of those parts of the microporous thermal insulation material that came into contact with the water, thereby rendering the microporous thermal insulation material unusable.

When treated with a water-based sodium silicate adhesive sold under the Trade Mark IDENDEN HT 10-02, the adhesive readily wetted the surface of the microporous thermal insulation material and formed a continuous protective coating thereon. However, the water in the adhesive again caused the thermal insulation material to shrink and destroyed the microporous nature of those parts of the microporous thermal insulation material that came into contact with the water, thereby rendering the microporous thermal insulation material unusable.

Thus conventional hydrophilic microporous thermal insulation material is not well suited to receive a water-based protective coating composition because the microporous nature of the insulation material is destroyed where it comes into contact with the water.

EXAMPLE 2 (COMPARATIVE)

The tests carried out in Example 1 were repeated on a block of untreated hydrophobic microporous thermal insulation material. When water was applied to the surface of the hydrophobic microporous thermal insulation material, the water remained in discrete droplets on the surface of the material and was not absorbed. If the surface was inclined, the droplets ran off leaving behind a dry surface.

When treated with a water-based fire retardant paint sold under the Trade Mark TIMONOX, the paint remained in discrete droplets and did not form a continuous protective coating on the surface of the hydrophobic material.

When treated with a water-based coating composition sold under the Trade Mark ZORKOTE, the coating composition remained in discrete droplets and did not form a continuous protective coating on the surface of the hydrophobic material.

When treated with a water-based sodium silicate adhesive sold under the Trade Mark IDENDEN HT 10-02, the adhesive remained in discrete droplets and did not form a continuous protective coating on the surface of the hydrophobic material.

Thus conventional hydrophobic microporous thermal insulation material is not well suited to receive a water-based protective coating composition because the coating composition remains in discrete droplets and will not form a continuous protective coating.

EXAMPLE 3 (COMPARATIVE)

The tests carried out in Example 1 were repeated on a sheet of asbestos-cement. The material employed in the tests was known as SINDANYO and is available from Tenmet Limited. The material comprises a mixture of 50 percent by weight Portland cement and 50 percent by weight asbestos. When treated with water, the water readily wetted the surface of the asbestos-cement and was absorbed giving rise to a dark wet patch on the surface of the material. This clearly demonstrates that the asbestos-cement is hydrophilic.

When treated with a water-based fire retardant paint sold under the Trade Mark TIMONOX, the paint readily wetted the surface of the asbestos-cement and formed a continuous protective coating thereon.

When treated with a water-based coating composition sold under the Trade Mark ZORKOTE, the coating composition readily wetted the surface of the asbestos-cement and formed a continuous protective coating thereon.

When treated with a water-based sodium silicate adhesive sold under the Trade Mark IDENDEN HT 10-02, the adhesive readily wetted the surface of the asbestos-cement and formed a continuous protective coating thereon.

Thus asbestos-cement is a hydrophilic material that is readily wetted by water and water-based coating compositions and presents no difficulty in relation to the provision of a water-based protective coating composition on the surface thereof.

The above tests were repeated after the surface of the asbestos-cement had been exposed to a gas flame, but as would be expected no difference in the application of water or the water-based coating compositions was apparent.

EXAMPLE 4

A block of microporous thermal insulation material containing a hydrophobing agent was exposed to a gas flame as described above and subsequently treated with water and with a number of water-based coating compositions. When treated with water, the water readily wetted the surface layer and was absorbed therein, thereby demonstrating that the surface layer had hydrophilic properties. However, the water did not cause the underlying hydrophobic microporous thermal insulation material to shrink and did not destroy the microporous nature thereof. The insulation material thus remained usable for its intended purpose.

When treated with a water-based fire retardant paint sold under the Trade Mark TIMONOX, the paint readily wetted the hydrophilic surface layer of the microporous thermal insulation material and formed a continuous protective coating thereon. Significantly, the water in the paint did not cause the underlying hydrophobic microporous thermal insulation material to shrink and did not destroy the microporous nature thereof. The insulation material thus remained usable for its intended purpose and was provided with a continuous protective coating.

When treated with a water-based coating composition sold under the Trade Mark ZORKOTE, the coating composition readily wetted the surface of the microporous thermal insulation material and formed a continuous protective coating thereon. Significantly, the water in the coating composition did not cause the underlying hydrophobic microporous thermal insulation material to shrink and did not destroy the microporous nature thereof. The insulation material thus remained usable for its intended purpose and was provided with a continuous protective coating.

When treated with a water-based sodium silicate adhesive sold under the Trade Mark IDENDEN HT 10-02, the adhesive readily wetted the surface of the microporous thermal insulation material and formed a continuous protective coating thereon. Once again, the water in the coating composition did not cause the underlying hydrophobic microporous thermal insulation material to shrink and did not destroy the microporous nature thereof. The insulation material thus remained usable for its intended purpose and was provided with a continuous protective coating.

Thus microporous thermal insulation material incorporating a hydrophobing agent which is treated so as to provide a hydrophilic surface layer on the underlying hydrophobic material is readily wetted by a water-based protective coating composition and permits a continuous protective coating to be formed. Such a coated material has the dual advantage that the microporous nature of the underlying hydrophobic microporous thermal insulation material is retained while a continuous protective coating can be provided.

We claim:

1. A method of coating a surface of hydrophobic microporous thermal insulation material comprising the steps of:

providing an inorganic microporous thermal insulation material having a surface, the thermal insulation material incorporating a hydrophobing agent distributed substantially there throughout so as to render the insulation material hydrophobic, said hydrophobing agent being subject to being dispelled by heating of said insulation material;

heating said surface of said hydrophobic microporous thermal insulation material to a temperature sufficient to dispel said hydrophobing agent therefrom so as to produce a surface layer of hydrophilic microporous thermal insulation material on said hydrophobic material; and applying a protective water-based coating composition to said hydrophilic surface layer of said hydrophobic material.

2. A method according to claim 1, wherein the surface of the microporous thermal insulation material is heated with a gas burner.

3. A method according to claim 2, wherein the gas burner is provided with an elongate flame nozzle.

4. A method according to claim 2, wherein the gas burner is fuelled with a mixture of an inflammable gas and compressed air.

5. A method according to claim 1, wherein the surface of the microporous thermal insulation material is heated in a furnace.

6. A method according to claim 1, wherein the coating is applied by brushing.

7. A method according to claim 1, wherein the coating is applied by spraying.

8. A method according to claim 1, wherein the coating composition is selected from the group consisting of a water-based silicate adhesive, a clay filled water-based silicate adhesive, a water-based paint, a water-based boron carbide composition, a water-based silica sol containing ceramic fibre and a clay filler, water-based colloidal silica, water-based polyvinylalcohol adhesive, and a solution of methyl cellulose in water.

9. A method according to claim 1 and including the step of applying an abrasive- and/or impact-resistant cover to the coating composition.

10. A method according to claim 9, wherein the cover comprises glass fibre cloth.

* * * * *